United States Patent
Gupta et al.

(10) Patent No.: US 12,301,528 B2
(45) Date of Patent: May 13, 2025

(54) METHODS, SYSTEMS, AND MEDIA FOR PROVIDING AUTOMATED REVIEW OF INCOMING MESSAGES IN A GROUP MESSAGING SERVICE

(71) Applicant: Integral Ad Science, Inc., New York, NY (US)

(72) Inventors: Vikram Gupta, Pune (IN); Prashant Jawale, Pune (IN); Bhavinkumar Jatinkumar Shah, Pune (IN)

(73) Assignee: Integral Ad Science, Inc., New York, NY (US)

( * ) Notice: Subject to any disclaimer, the term of this patent is extended or adjusted under 35 U.S.C. 154(b) by 0 days.

(21) Appl. No.: 18/243,976

(22) Filed: Sep. 8, 2023

(65) Prior Publication Data

US 2024/0089227 A1    Mar. 14, 2024

Related U.S. Application Data

(60) Provisional application No. 63/404,845, filed on Sep. 8, 2022.

(51) Int. Cl.
*H04L 51/212* (2022.01)
*H04L 51/216* (2022.01)

(52) U.S. Cl.
CPC .......... *H04L 51/212* (2022.05); *H04L 51/216* (2022.05)

(58) Field of Classification Search
CPC ... H04L 51/212; H04L 51/214; H04L 51/216; H04L 51/04; H04L 51/21; G06N 20/00; G06F 40/30; G06F 40/35
See application file for complete search history.

(56) References Cited

U.S. PATENT DOCUMENTS

| 2012/0047219 A1 | 2/2012 | Feng et al. |
| 2013/0014222 A1 | 1/2013 | Bhatia et al. |

(Continued)

FOREIGN PATENT DOCUMENTS

CN    112131377 A   * 12/2020

OTHER PUBLICATIONS

V. Gondaliya and K. Mandaviya, "An improved approach for online trending forum detection based on sentiment analysis, " 2016 International Conference on Inventive Computation Technologies (ICICT), Coimbatore, India, 2016, pp. 1-5. (Year: 2016).*

(Continued)

*Primary Examiner* — Messeret F Gebre
(74) *Attorney, Agent, or Firm* — Byrne Poh LLP

(57) ABSTRACT

Methods, systems, and media for providing automated review of incoming messages in a group messaging service are provided. In some embodiments, the method includes: receiving, at a user device from a server, an incoming message to a particular message group in a group messaging service, wherein the user device is associated with the particular message group; determining, using a machine learning classifier at the user device, (i) a context of the particular message group based on a plurality of content items previously submitted by a plurality of users to the particular message group; (ii) a plurality of sentiments in the incoming message; (iii) a plurality of similarity scores, wherein each similarity score is a probability that a sentiment from the plurality of sentiments is similar to the context of the particular message group; and (iv) an aggregate similarity score based on the plurality of similarity scores is within a first range of predetermined values; and, in response to determining the aggregate similarity score is within the first range of predetermined values, displaying a preview of the incoming message on the user device, (Continued)

wherein the preview includes at least one sentiment from the plurality of sentiments.

23 Claims, 6 Drawing Sheets

(56) References Cited

U.S. PATENT DOCUMENTS

| | | | | |
|---|---|---|---|---|
| 2018/0350144 | A1* | 12/2018 | Rathod | G06Q 20/3224 |
| 2019/0149501 | A1* | 5/2019 | Bastide | G06Q 50/01 |
| | | | | 709/206 |
| 2020/0076746 | A1* | 3/2020 | Penrose | G06N 3/08 |
| 2022/0377035 | A1* | 11/2022 | Shapiro | H04L 51/063 |

OTHER PUBLICATIONS

Maltseva, A., Shilkina, N., Tiomniy, I., Makhnytkina, O., & Lizunova, I. (2019). Theory of semantic field for sentiment-analysis of the language of specific users' group in social media (case of freelancer groups (Year: 2019).*

B. Gui and X. Yang, "Research on Sentiment Tendency Analysis of Microtext Based on Sense Group," 2013 Ninth International Conference on Computational Intelligence and Security, Emeishan, China, 2013, pp. 129-133. (Year: 2013).*

* cited by examiner

METHODS, SYSTEMS, AND MEDIA FOR PROVIDING AUTOMATED REVIEW OF INCOMING MESSAGES IN A GROUP MESSAGING SERVICE

CROSS-REFERENCE TO RELATED APPLICATIONS

This application claims the benefit of U.S. Provisional Patent Application No. 63/404,845, filed Sep. 8, 2022, which is hereby incorporated by reference herein in its entirety.

TECHNICAL FIELD

The disclosed subject matter relates to methods, systems, and media for providing automated review of incoming messages in a group messaging service.

BACKGROUND

Many people use modern communication tools such as group messaging, which can be found across a variety of social media platforms and text messaging applications. The group members in these group messaging platforms often share similar interests and exchange messages and/or multimedia content relating to those shared interests. These group members, however, can become frustrated when content is shared to the group that is outside of the group's focus. In some cases, a new user is not aware of the focus of the group and shares content that may offend one or more of the group members. In other cases, a group member can share content that distracts from the group's focus, such as advertising content for that member's own products or services. Additionally, a group member can post a link to a webpage that has age-inappropriate content, or which contains malware, but which is disguised to appear relevant to the group.

It can be difficult, however, to moderate incoming messages to a group chat. For example, a group administrator can review incoming posts before the posts are distributed to all of the group members. The group administrator may not have the time to read and review each incoming post carefully and can easily become burdened with rejecting offensive content.

Accordingly, it is desirable to provide new mechanisms for providing automated review of incoming messages in a group messaging service.

SUMMARY

Methods, systems, and media for providing automated review of incoming messages in a group messaging service are provided.

In accordance with some embodiments of the disclosed subject matter, a method for presenting messages in a group messaging service is provided, the method comprising: receiving, at a user device from a server, an incoming message to a particular message group in a group messaging service, wherein the user device is associated with the particular message group; determining, using a machine learning classifier at the user device, (i) a context of the particular message group based on a plurality of content items previously submitted by a plurality of users to the particular message group; (ii) a plurality of sentiments in the incoming message; (iii) a plurality of similarity scores, wherein each similarity score is a probability that a sentiment from the plurality of sentiments is similar to the context of the particular message group; and (iv) an aggregate similarity score based on the plurality of similarity scores is within a first range of predetermined values; and, in response to determining the aggregate similarity score is within the first range of predetermined values, displaying a preview of the incoming message on the user device, wherein the preview includes at least one sentiment from the plurality of sentiments.

In some embodiments, determining the plurality of similarity scores further comprises determining a cosine similarity score between a sentiment from the plurality of sentiments and the context of the particular message group.

In some embodiments, determining the aggregate similarity score based on the plurality of similarity scores further comprises determining a plurality of statistics for the plurality of similarity scores and additionally determining that at least one statistic in the plurality of statistics is equivalent to a target statistical value from a plurality of target statistical values.

In some embodiments, the method further comprises: determining, using the plurality of statistics, that a particular sentiment from the plurality of sentiments is an anomalous sentiment from the plurality of sentiments; and, in response to determining that the particular sentiment is the anomalous sentiment, sending the incoming message to the server with a request for review of the incoming message from an administrative user of the particular message group.

In some embodiments, the method further comprises: receiving an indication from the server that the incoming message is approved by the administrative user; and, in response to receiving the indication that the incoming message is approved, displaying the preview of the incoming message on the user device.

In some embodiments, the method further comprises: receiving an indication from the server that the incoming message is disapproved by the administrative user; and, in response to receiving the indication that the incoming message is rejected, discarding the incoming message without displaying the preview of the incoming message on the user device.

In some embodiments, the method further comprises: determining that the aggregate similarity score based on the plurality of similarity scores is outside of the first range of predetermined values; in response to determining that the aggregate similarity score is outside of the first range of predetermined values, sending the incoming message to the server with a request to review a membership status for the particular message group of a particular user that created the incoming message; and discarding the incoming message without displaying the preview of the incoming message on the user device.

In some embodiments, the method further comprises: determining that a second user device has reported the incoming message to the server as being incompatible with the context of the particular message group; and, in response to determining that the second user device has reported the incoming message, discarding the incoming message without displaying the preview of the incoming message on the user device.

In some embodiments, the method further comprises associating at least one of an indication of the second user device reporting the incoming message, the context of the particular message group, the plurality of sentiments from the incoming message, and the plurality of similarity scores with a training dataset for the machine learning model.

In some embodiments, the machine learning classifier is trained at the server with a training dataset comprising a second plurality of content items from a second message group in the group messaging service, wherein the machine learning classifier, during training, determines the probability that a second plurality of sentiments from each content item in the second plurality of content items is similar to the context of the second message group.

In some embodiments, the method further comprises determining, using the machine learning classifier at the user device, a plurality of safety scores, wherein each safety score is a probability that a sentiment from the plurality of sentiments is similar to a reference message in a safety reference dataset; determining an aggregate safety score; identifying a second range of predetermined values corresponding to a safety threshold for the user device; determining that the aggregate safety score is outside of the second range of predetermined values; in response to determining that the aggregate safety score is outside the second range of predetermined values, displaying a preview of the incoming message with a safety warning message included in the preview of the incoming message.

In accordance with some embodiments of the disclosed subject matter, a system for presenting messages in a group messaging service is provided, the system comprising a hardware processor that is configured to: receive, at a user device from a server, an incoming message to a particular message group in a group messaging service, wherein the user device is associated with the particular message group; determine, using a machine learning classifier at the user device, (i) a context of the particular message group based on a plurality of content items previously submitted by a plurality of users to the particular message group; (ii) a plurality of sentiments in the incoming message; (iii) a plurality of similarity scores, wherein each similarity score is a probability that a sentiment from the plurality of sentiments is similar to the context of the particular message group; and (iv) an aggregate similarity score based on the plurality of similarity scores is within a first range of predetermined values; and, in response to determining the aggregate similarity score is within the first range of predetermined values, display a preview of the incoming message on the user device, wherein the preview includes at least one sentiment from the plurality of sentiments.

In accordance with some embodiments of the disclosed subject matter, a non-transitory computer-readable medium containing computer executable instructions that, when executed by a processor, cause the processor to perform a method for presenting messages in a group messaging service is provided, the method comprising: receiving, at a user device from a server, an incoming message to a particular message group in a group messaging service, wherein the user device is associated with the particular message group; determining, using a machine learning classifier at the user device, (i) a context of the particular message group based on a plurality of content items previously submitted by a plurality of users to the particular message group; (ii) a plurality of sentiments in the incoming message; (iii) a plurality of similarity scores, wherein each similarity score is a probability that a sentiment from the plurality of sentiments is similar to the context of the particular message group; and (iv) an aggregate similarity score based on the plurality of similarity scores is within a first range of predetermined values; and, in response to determining the aggregate similarity score is within the first range of predetermined values, displaying a preview of the incoming message on the user device, wherein the preview includes at least one sentiment from the plurality of sentiments.

In accordance with some embodiments of the disclosed subject matter, a system for presenting messages in a group messaging service is provided, the system comprising: means for receiving, at a user device from a server, an incoming message to a particular message group in a group messaging service, wherein the user device is associated with the particular message group; means for determining, using a machine learning classifier at the user device, (i) a context of the particular message group based on a plurality of content items previously submitted by a plurality of users to the particular message group; (ii) a plurality of sentiments in the incoming message; (iii) a plurality of similarity scores, wherein each similarity score is a probability that a sentiment from the plurality of sentiments is similar to the context of the particular message group; and (iv) an aggregate similarity score based on the plurality of similarity scores is within a first range of predetermined values; and means for displaying a preview of the incoming message on the user device, wherein the preview includes at least one sentiment from the plurality of sentiments in response to determining the aggregate similarity score is within the first range of predetermined values.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
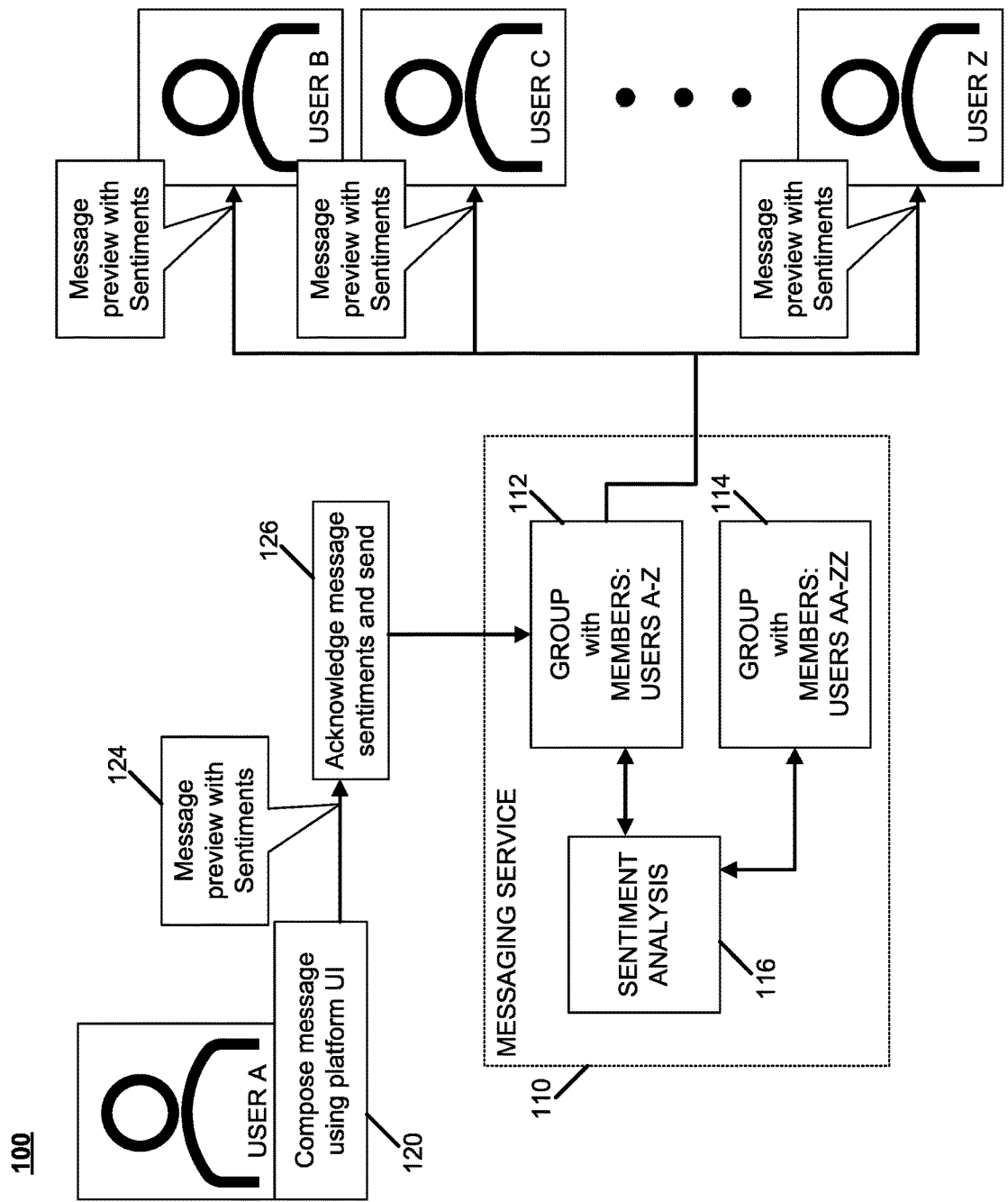
FIG. 1 is an example block diagram of a group messaging service with automated review of incoming messages in accordance with some embodiments of the disclosed subject matter.

In accordance with various embodiments of the disclosed subject matter, mechanisms (which can include methods, systems, and media) for automating review of incoming messages in a group messaging service are provided.

Group chats, topical groups, and online forums are a common way for people to pursue interests and stay connected with like-minded individuals. Many avenues exist for users to find a group with the same interests, and different platforms have different levels of moderation tools available to the group members. For example, some groups can be found by searching on the platform (i.e., open groups) while other groups can only be found through a specific invite from another group member (i.e., closed groups). In either case, group membership allows users to express their thoughts and opinions on topics that most interest them. Thus, it can be frustrating and, in some cases, offensive when a post appears in the group message that is outside of the scope of previous messages within the group.

As a particular example, a given social media site can have a group channel for animal lovers, where members can share posts regarding pet care, animal rescue stories, pictures and/or videos of their own animals, etc. In this example, a particular group member can share a post (or reply to a post in a comment section, etc.) discussing the benefits of including animal meat products in their diet. This type of content can be offensive to group members who are vegetarian, or simply because it is out of context for the group's focus of promoting the general well-being of animals. In a different example, a user can share a universal resource locator (URL) which appears to link to photos of cute animals but instead re-directs a person that clicks on or otherwise selects the URL to a website that displays adult content, violent content, and/or malware.

In another particular example, a text-messaging group can form among two or more colleagues who are interested in discussing the stock market. Generally, group members can transmit text messages back and forth between the group members about stock fundamentals, price movement, and price predictions of various publicly traded companies. In this example, a new member can join the group and then mistakenly or unintentionally send non-contextual messages, such as a cooking recipe or a link to purchase a good or a service (e.g., an online course on money management). The content shared by the new group member may be irrelevant to the context of the group, and can result in the new member being removed from the group without an understanding of the reason for their removal. In some embodiments, the context of the group can be determined from the subject matter of the group, the message history of the group, and/or a plurality of sentiments associated with the group.

In some embodiments, the mechanisms described herein can identify incoming messages to a message group. In some embodiments, the mechanisms can use any suitable machine learning model to determine one or more sentiments, which can include topical keywords, in the incoming message. In some embodiments, the mechanisms can use any suitable machine learning model to determine a context of the message group based on, for example, previous messages exchanged in the message group.

In some embodiments, the mechanisms can determine similarity scores between the sentiments of an incoming message and the context of the message group. For example, in some embodiments, the mechanisms can determine that sentiments in the incoming message are likely to be similar to the context of the group. In some embodiments, the mechanisms can determine that an aggregate similarity score is within a first range of predetermined values. In some embodiments, determining that the aggregate similarity score is within the first range of predetermined values can comprise determining that the aggregate similarity score is above a threshold value, and can distribute the incoming message to members of the message group. Additionally or alternatively, in some embodiments, the mechanisms can distribute the incoming message as a message preview with any suitable additional information, such as the determined sentiments of the incoming message, prior to transmitting the incoming message to members of the message group. In continuing this example, the message preview can provide each member of the message group to provide an indication as to whether the message should be distributed to the message group based on the message preview.

Turning to FIG. 1, an example block diagram 100 of a group messaging service with automated review of incoming messages in accordance with some embodiments of the disclosed subject matter is shown. In some embodiments, block diagram 100 can include messaging service 110 and users A through Z of messaging service 110.

In some embodiments, messaging service 110 can be any suitable service, such as a simple messaging service (SMS), multimedia messaging service (MMS), and/or any other suitable group chat offered by a cellular service provider, a social media platform, a direct messaging service and/or commenting service that is offered within a website, a discussion forum and/or message board with multiple message threads and/or discussion rooms, a chat room, an instant messaging service with a group feature (e.g., WhatsApp, Facebook, WeChat, etc.), and/or any other suitable communication service. In some embodiments, messaging service 110 can allow users to send and receive any suitable type of content item(s). For example, in some embodiments, messaging service 110 can allow users to send and receive text-based messages, emojis, stickers, photos, animations, such as GIFs and/or any other suitable media file type, audio clips, video clips, etc. In some embodiments, messaging service 110 can automatically detect a string of text that is a universal resource locator (URL), and can modify the presentation of the text in any suitable manner, such as underlining and/or including a webpage preview in any message containing a URL. In some embodiments, messaging service 110 can include direct messaging, group messaging, and/or any other suitable communication mechanism such as allowing individual users to share messages publicly across the messaging service.

In some embodiments, messaging service 110 can have any suitable user interface, such as a mobile application, desktop application, and/or any other suitable mechanism for a user device to send and receive messages within the group messaging service. In some embodiments, messaging service 110 can use any suitable protocol to transmit messages between user devices. In some embodiments, messages sent and received through messaging service 110 can be encrypted and/or decrypted at the user device(s) as part of the transmission protocol. In some embodiments, messages can remain encrypted during transmission across messaging service 110.

In some embodiments, messaging service 110 can include a service and/or feature that allows users to form and/or join message groups such as group 112 and/or group 114. In some embodiments, messaging service 110 can have any suitable quantity of groups. In some embodiments, a user of messaging service 110 can be a member of any suitable message group with any suitable membership policy. For example, in some embodiments, a user can be a member of an open message group where the message group can be publicly found and/or membership in the group does not require administrative authorization. In another example, in some embodiments, a user can be a member of a closed message group where membership in the message group requires an invitation and/or administrative review and/or authorization.

In some embodiments, groups such as group 112 and/or group 114 can be based around any suitable subject matter. For example, in some embodiments, group 112 and/or group 114 can be based on discussion topics for a given region in a geographic area such as a neighborhood, city, state, province, etc. In another example, in some embodiments, group 112 and/or group 114 can be based on discussion topics for a given hobbies and/or activities (e.g., any suitable video game, gardening, outdoor sports, gem collecting, woodworking, pet care, etc.). In some embodiments, members of the group messaging service can determine the subject matter of the group to be any suitable topic based on the interests of the group members, and in some embodiments, the subject matter can vary with time. In some embodiments, group 112 and/or group 114 can advertise the subject matter of the group through any suitable mechanism, such as a group name, description, frequently asked questions article, list of rules and/or policies, etc.

In some embodiments, group 112 and/or group 114 can have multiple types of group membership. For example, in some embodiments, a certain user can be selected (e.g., through self-selection, group member voting, etc.) as an administrator of the group. In another example, in some embodiments, users that recently joined and/or are recently added to a group can be given a particular status, such as a provisional status. In some embodiments, a user that has a particular type of group membership can make use of additional features and/or can have a modified experience of the group. For example, in some embodiments, a particular message group such as group 112 can require that messages sent to the group by a provisional group member are subjected to review before being presented to the rest of the group members.

In some embodiments, group 112 and/or group 114 can have any suitable moderation tools for group administrators and/or group members to use. For example, in some embodiments, group administrators can moderate group membership and can review content items posted to the group. Continuing this example, in some embodiments, group administrators can set a membership requirement based on any suitable criteria and can reject a potential group member based on the membership requirement, behavior within the group, and/or any other suitable user actions. In some embodiments, group members can flag messages using any suitable mechanism. For example, in some embodiments, a user can flag a message as being spam and/or inappropriate to the group context, and can request that a group administrator review the message.

In some embodiments, as shown in FIG. 1, user A can be a member of group 112 and can compose message 120 such that message 120 is distributed, via messaging service 110, to other members of group 112 such as users B through Z. In some embodiments, user A can compose message 120 using any suitable user interface, such as a user interface associated with a mobile application for messaging service 110. In some embodiments, while user A is composing message 120, user A can be presented with automatically detected sentiments. In particular, in some embodiments, user A can be presented with a preview of the message 120 as indicated by preview 124. In some embodiments, preview 124 can contain sentiments of message 120. In some embodiments, sentiments of message 120 can be determined using any suitable mechanism, such as module 116 as discussed below. Note that while FIG. 1 indicates module 116 is a component of the messaging service, in some embodiments, any suitable version of module 116 can be included in any suitable program and/or application distributed by messaging service 110, such as the user interface used to compose message 120. That is, in some embodiments, analysis of message 120 can be performed locally at user A's device in some embodiments. In some embodiments, preview 124 can include any additional user interface elements, such as a confirmation button, a warning message, suggestions for alternative content to include in the message, one or more sentiments that appear to be associated with the message, etc. In some embodiments, user A can interact with preview 124 and can acknowledge the sentiments and/or any other content shown in preview 124 and can send message 120 to message service 110 for distribution across the group.

In some embodiments, message 120 can be any suitable message. For example, in some embodiments, message 120 can be a new post, a new thread, a comment on another post and/or discussion thread, a direct message, a status update, a polling question, and/or any other suitable style of message based on the available features and message styles within messaging service 110. In some embodiments, message 120 can be a link to an existing message in the same and/or another message group in messaging service 110 (e.g., a "re-share").

In some embodiments, message 120 can be analyzed by messaging service 110 using any suitable mechanism before messaging service 110 distributes message 120 to group members of Group 112 such as user B through Z. For example, in some embodiments, message 120 can be an incoming message that is automatically reviewed as described in process 200 in connection with FIG. 2 below.

In some embodiments, messaging service 110 can include any suitable analysis mechanisms, such as sentiment analysis module 116. In some embodiments, module 116 can be used by groups, such as group 112 and/or group 114, and can automatically review incoming messages such as message 120. In some embodiments, module 116 can take message content as input and can determine the sentiments associated with the message 120, including topical keywords, subjective qualities (e.g., positive, negative, etc.), and/or any other suitable summarization of the message content.

In some embodiments, incoming message 120 can comprise a URL, and module 116 can scan the URL and/or a header of the webpage associated with the URL to determine sentiments of the URL, which are considered as being part of the sentiments of the incoming message.

In some embodiments, module 116 can include a machine learning classifier and/or model and can include any suitable analysis techniques. In some embodiments, module 116 can include an analysis component for each type of content that messaging service 110 allows users to include in a message such as incoming message 120. For example, module 116 can include a natural language processing component to analyze strings of text, an image processing component that can perform object, facial, and/or text recognition on images and video frames sent in messages, and/or an audio-processing component to analyze audio clips and/or audio from video footage.

In some embodiments, any suitable natural language processing techniques included in module 116 to analyze strings of text can additionally or alternatively be used to account for misspellings, variations in typing (e.g., capitalization), and/or any other sources of variance. For example, fuzzy string searching, normalization of letter-case, use of a dictionary to account for use of different words with the same meaning, use of a dictionary to account for words used in different languages, and/or any other suitable techniques can be used.

In some embodiments, particularly in an implementation where module 116 includes a machine learning classifier, module 116 can utilize any one or more of the following models/algorithms, alone or in combination: hidden Markov models; recurrent neural networks; convolutional neural networks (CNNs); deep learning; Bayesian symbolic methods; general adversarial networks (GANs); support vector machines; image registration methods. In some embodiments, machine learning classifier(s) within module 116 can also be based on clustering algorithms (e.g., a Mini-batch K-means clustering algorithm), a recommendation algorithm, and/or an anomaly detection algorithm, such as a local outlier factor.

In some embodiments, particularly in an implementation where module 116 is a machine learning model, module 116 can be trained on any suitable dataset. For example, in some embodiments, module 116 can use the message history of another group, such as group 114, within messaging service 110 to train a machine learning model and/or machine learning classifier within module 116. In this example, in some embodiments, module 116 can take a subset of the message history of group 114 as input, and can output a likelihood that a message not in the subset of message history is similar to the context of the subset of message history.

In some embodiments, module 116 can use any suitable natural language processing, image processing, audio processing, video processing, and/or sentiment analysis technique(s) to determine the context of group 112 and/or group 114, which can include topics or keywords, sentiments, and/or any other suitable information associated with group 112 and/or group 114. Note that, in some embodiments, module 116 can analyze messages exchanged in group 112 and/or group 114 over any suitable time period. For example, in some embodiments, module 116 can analyze messages exchanged in group 112 and/or group 114 within the past minute, past two minutes, past five minutes, and/or any other suitable time period to identify past and/or current topics of conversation within group 112 and/or group 114. In some such embodiments, module 116 can repeat the analysis at any suitable frequency (e.g., once per minute, every two minutes, every five minutes, and/or any other suitable frequency). For example, in some embodiments, module 116 can identify one or more commonly occurring words that indicate a topic or keyword associated with group 112 and/or group 114. As a more particular example, in some embodiments, module 116 can determine the top N (e.g., one, two, five, ten, and/or any other suitable number) most commonly occurring words in group 112 and/or group 114, and can identify a subset of the top N words as the context of group 112 and/or group 114. In some embodiments, module 116 can exclude any suitable words or types of words from the top N words (e.g., prepositions, articles such as "a" or "the," and/or any other suitable types of words). As another example, in some embodiments, module 116 can determine that one or more words related to common feelings (e.g., happiness, excitement, sadness, anger, and/or any other suitable attitudes) have occurred more than a predetermined number of times in group 112 and/or group 114. In some embodiments, any of these identified words and/or topics can be included in the context of group 112 and/or group 114 determined by module 116.

Note that, in some embodiments, module 116 can analyze messages sent by a subset of group members from group 112 and/or group 114. For example, in some embodiments, module 116 can analyze messages that have received more than a predetermined number of endorsements and/or other engagement (e.g., more than a predetermined number of other users indicating that they like the message, more than a predetermined number of replies or shares of the message, and/or any other suitable metric). In some embodiments, the subset of participants can include any suitable number of participants (e.g., one, two, five, ten, twenty, fifty, one hundred, and/or any other suitable number). In some embodiments, module 116 can determine the context of the group based on analyzing messages sent by a subset of group members.

In some embodiments, after incoming message 120 is analyzed by module 116, messaging service 110 can distribute incoming message 120 and/or message preview 124 to group members B through Z. In some embodiments, messaging service 120 can include any suitable additional content, such as sentiments output from module 116, when distributing incoming message 120 and/or message preview 124. In some embodiments, the sentiment included in preview 124 can be the sentiment with the highest similarity score, as discussed below at block 206 of process 200 in connection with FIG. 2. In some embodiments, a group of sentiments can be included in preview 124, where each sentiment has a similarity score within a range of predetermined values. In some embodiments, preview 124 can include a portion of incoming message 120. In some embodiments, preview 124 can include the entire content of incoming message 120. In some embodiments, any suitable mechanism can be used to generate preview 124, such as process 300 as discussed below in connection with FIG. 3A. In some embodiments, preview 124 can include any suitable additional content, such as a safety warning message as discussed below in connection with FIG. 3B.

Figure 2:
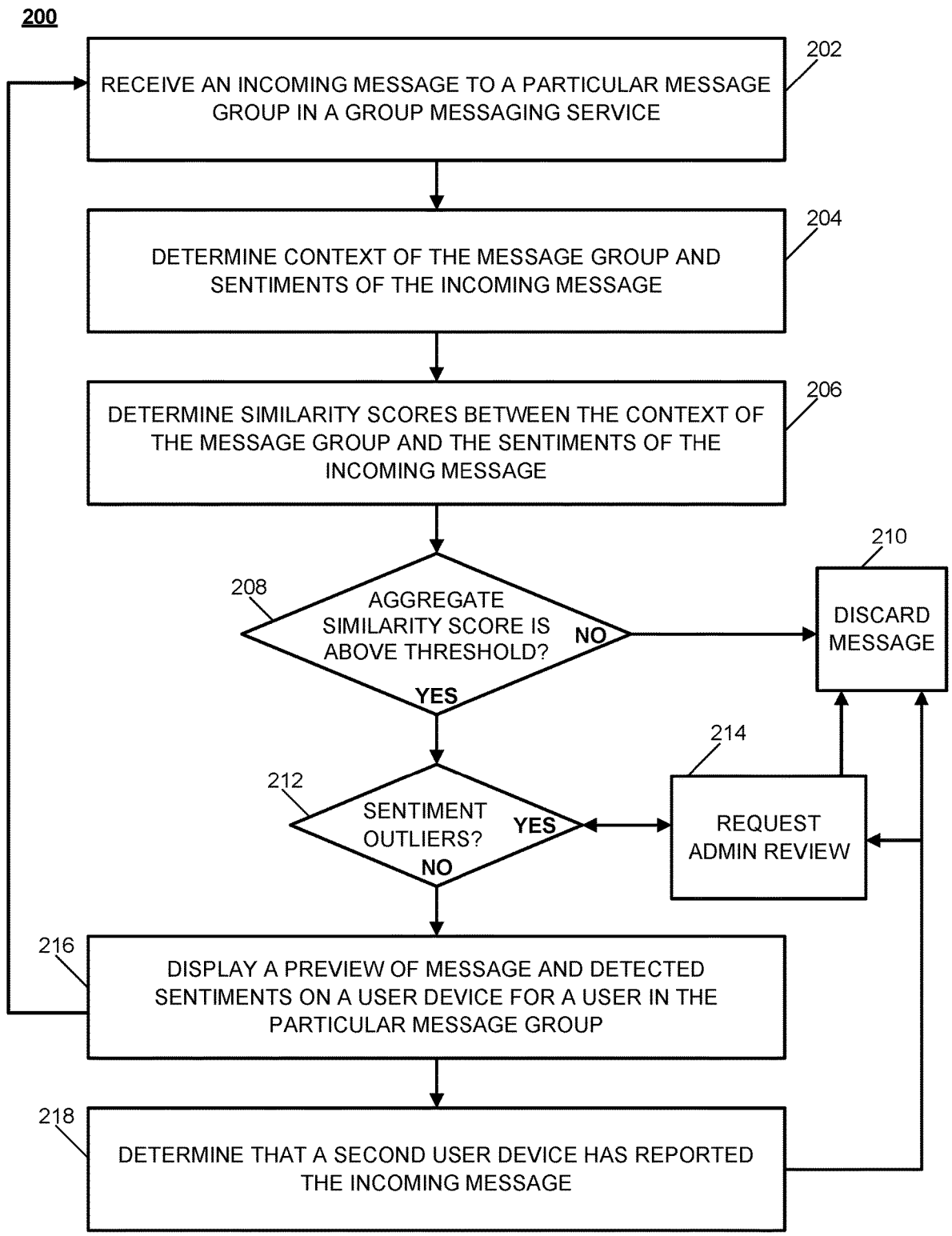
FIG. 2 is an example flow diagram of a method for providing automated review of incoming messages in a group messaging service in accordance with some embodiments of the disclosed subject matter.

Turning to FIG. 2, an example flow diagram of a process 200 for providing automated review of incoming messages to a group messaging service in accordance with some embodiments of the disclosed subject matter is shown. In some embodiments, process 200 can be executed on any suitable device, such as server 402 and/or user devices 406 discussed below in connection with FIG. 4.

As shown, process 200 can begin at block 202 in some embodiments when a server and/or a user device receives an incoming message to a particular message group in a group messaging service. In some embodiments, the server and/or user device is associated with the particular message group. For example, in some embodiments, a user device that is a member of a message group can receive a message at the user device, and process 200 can be executed before displaying the message on the user device. In another example, in some embodiments, a server which is used by the group messaging service to transmit messages can receive the incoming message.

In some embodiments, at block 202, process 200 can additionally determine that multiple incoming messages have been received from the same user device and/or user account, particularly within a short window of time (e.g., within two minutes, within five minutes, etc.), and can combine the multiple messages such that the remaining blocks of process 200 are executed with the multiple incoming messages. That is, in some embodiments, descriptions of blocks 202-218 of process 200 can include analysis and/or determinations on multiple messages when referring to an incoming message.

In some embodiments, process 200 can continue at block 204 when process 200 determines the context of the message group that has received the incoming message, and can additionally determine sentiments of the incoming message.

In some embodiments, process 200 can use any suitable mechanism, such as a machine learning classifier that can utilize natural language processing, image processing, audio processing, and/or video processing, to determine the context of the message group that has received the incoming message. For example, in some embodiments, process 200 can use a sentiment analysis module, such as module 116 as described above in connection with FIGS. 1, to determine the context of the message group based on the message history within the particular message group. In some embodiments, process 200 can determine the context of the message group using any suitable metadata associated with the group. For example, in some embodiments, process 200 can use a group name, a group description, and/or any other suitable information included with the group to determine the context of the group.

In some embodiments, process 200 can use any suitable mechanism, such as a machine learning classifier that can utilize natural language processing, image processing, audio processing, and/or video processing to determine sentiments of the incoming message. For example, in some embodiments, process 200 can use a sentiment analysis module such as module 116 as described above in connection with FIG. 1 to determine sentiments of the incoming message. In some embodiments, process 200 can determine a type of content included in the incoming message, such as an image, an emoji, an animated file (i.e., GIF), and/or a string of text, and can use any suitable analysis based on the type of content. For example, in some embodiments, process 200 can determine that the incoming message contains an image and a string of text. Continuing this example, process 200 can use natural language processing to determine what is included in the string of text, and can additionally use image recognition techniques to determine what is shown in the image portion of the message. In some embodiments, process 200 can combine the results of multiple analysis techniques to determine one or more sentiments in the incoming message from multiple types of content. In some embodiments, process 200 can use the results of a first type of analysis (e.g., natural language processing output from a string of text) to inform the results of a second type of analysis. That is, in some embodiments, process 200 can determine that a string of text is a caption for an image included in the incoming message, and the identified text can be used to refine the image analysis in determining the context of the incoming message.

In some embodiments, at block 206, process 200 can determine a series of similarity scores between the context of the message group and the sentiments of the incoming message, using for example, a machine learning classifier. For example, in some embodiments, process 200 can use a cosine similarity score to determine the likelihood or probability that a sentiment from the incoming message is similar to one or more context(s) of the group. As a particular example, in some embodiments, the sentiments determined at block 204 for the incoming message can include "floral," and the context determined at block 204 for the group message where a user has directed the incoming message can include "home gardening." In this particular example, at block 206, process 200 can determine the likelihood that "floral" is similar to "home gardening" to be 0.95, or 95%.

In some embodiments, at block 206, process 200 can divide the incoming message into portions based on, e.g., punctuation, capitalization, determined phrases, determined clauses, etc., in the incoming message. In some embodiments, process 200 can determine similarity scores between the sentiments in each portion of the incoming message and the context of the message group.

In some embodiments, at block 208, process 200 can determine any suitable aggregate similarity score and/or statistics based on the similarity scores determined at block 206, using for example, a machine learning classifier. In some embodiments, the aggregate similarity score can be any suitable combination and/or output of a calculation using the similarity scores. For example, the aggregate similarity score can be a sum, a weighted sum, a max value, a min value, and/or any other representative value from the similarity scores. In another example, in some embodiments, the aggregate similarity score can be a similarity score from a portion of the incoming message.

In another example, process 200 can determine that the similarity scores follow a particular statistical distribution such as a normal distribution and/or a bi-modal distribution. In yet another example, in some embodiments, process 200 can determine the mean of the similarity scores, and can additionally determine the standard deviation from the mean of the similarity scores. Continuing this example, process 200 can determine that a particular similarity score is a statistical outlier, for example, by determining that within the distribution of similarity scores, a particular similarity score is at least 2 or more standard deviations from the mean of the similarity scores. As a particular example, in some embodiments, an incoming message can contain the sentiments "positive", "floral", "candles", and "homemade" where a user has directed the incoming message to a group whose context is "home gardens." In this particular example, the similarity scores between the incoming sentiments, respectively, and the context are {0.8, 0.95, 0.3, 0.7}, and process 200 can determine that the similarity score of 0.3 between "candles" and "home gardening" is an outlier. In some embodiments, at block 206, process 200 can discard any statistical outliers from the aggregate of similarity scores. In some embodiments, at block 206, process 200 can store an indication of the statistical outliers (e.g., for review by a group administrator).

In some embodiments, at block 208, process 200 can compare the aggregate similarity score to a threshold value. In some embodiments, the threshold value can be a constant numeric value that is set by the messaging service and/or by any suitable member (such as an administrative member) of the particular message group. In some embodiments, the threshold value can be a first range of predetermined values.

In some embodiments, process 200 can determine that the aggregate similarity score is within a second range of predetermined values, the first range of predetermined values not overlapping with the second range of predetermined values, and can continue to block 210. In some embodiments, determining that the aggregate similarity score is within the second range of predetermined values can comprise determining that the aggregate similarity score is below the threshold value. In some embodiments, process 200 can discard the incoming message at block 210.

In some embodiments, process 200 can determine that the aggregate similarity score is above the threshold value (e.g., within the first range of predetermined values) and can continue to block 212.

In some embodiments, process 200 can check for stored indications of statistical outliers in the similarity scores. In some embodiments, process 200 can determine that there are statistical outliers in the similarity scores and can continue to block 214 where process 200 can request manual review, for example from a group administrator. In some embodiments, a group administrator can reject the message at block 214 and process 200 can continue to block 210 to discard the incoming message. For example, in some embodiments, a group administrator can review the incoming message with the sentiments "positive", "floral", "candles", and "homemade" in the group whose context is "home gardens", and the group administrator can determine that the message is advertising homemade candles for sale, which is not a type of post that members of the particular group for discussion on "home gardens" find relevant or of interest. In this example, the group administrator can use any suitable mechanism (i.e., in a user interface) to advance process 200 to block 210 where process 200 can discard the message.

In some embodiments, process 200 can determine at block 212 that there are no statistical outliers in similarity scores, and process 200 can continue to block 216.

In some embodiments, at block 216, process 200 can display a preview of the incoming message. For example, in some embodiments, process 200 can display a preview such as preview 124 as discussed above in connection with FIG. 1. In another example, in some embodiments, process 200 can generate a preview for display at block 216 using any suitable mechanism, such as process 300 as described below in connection with FIG. 3A. In some embodiments, process 200 can display the preview of the incoming message on any suitable user device, such as a user device that is associated with the particular message group. In some embodiments, process 200 can display the preview as a notification (e.g., push notification) and/or any suitable new message icon in a user interface associated with the messaging service.

In some embodiments, at block 218, process 200 can determine that the incoming message has been reported, for example, as "not being similar" to the context of the particular group. In some embodiments, a user that received the message preview at 216 can use any suitable mechanism to report the incoming message. For example, in some embodiments, a user can read the message preview in a user interface associated with the messaging service and can use a button within the user interface to submit a report. In some embodiments, a user-generated report can cause process 200 to continue to block 210, where process 200 can discard the message. In some embodiments, a user-generated report can cause process 200 to continue to block 214, where process 200 can request an administrative review of the incoming message.

In some embodiments, process 200 can additionally store an indication of the user-generated report at block 218. For example, in some embodiments, process 200 can store an indication of the incoming message, the determined context and sentiments, a list of the determined similarity scores, and/or any other suitable information. In some embodiments, the stored indications can be used for any suitable additional refinement of process 200. For example, in some embodiments, the stored indication can be associated with training data that is used to train a machine learning model used by process 200 at blocks 204 and/or 206 as described above.

In some embodiments, process 200 can be executed any suitable number of times. For example, in some embodiments, process 200 can loop after block 216 when process 200 receives a next incoming message to the same and/or a different particular message group in the group messaging service.

Figure 3A:
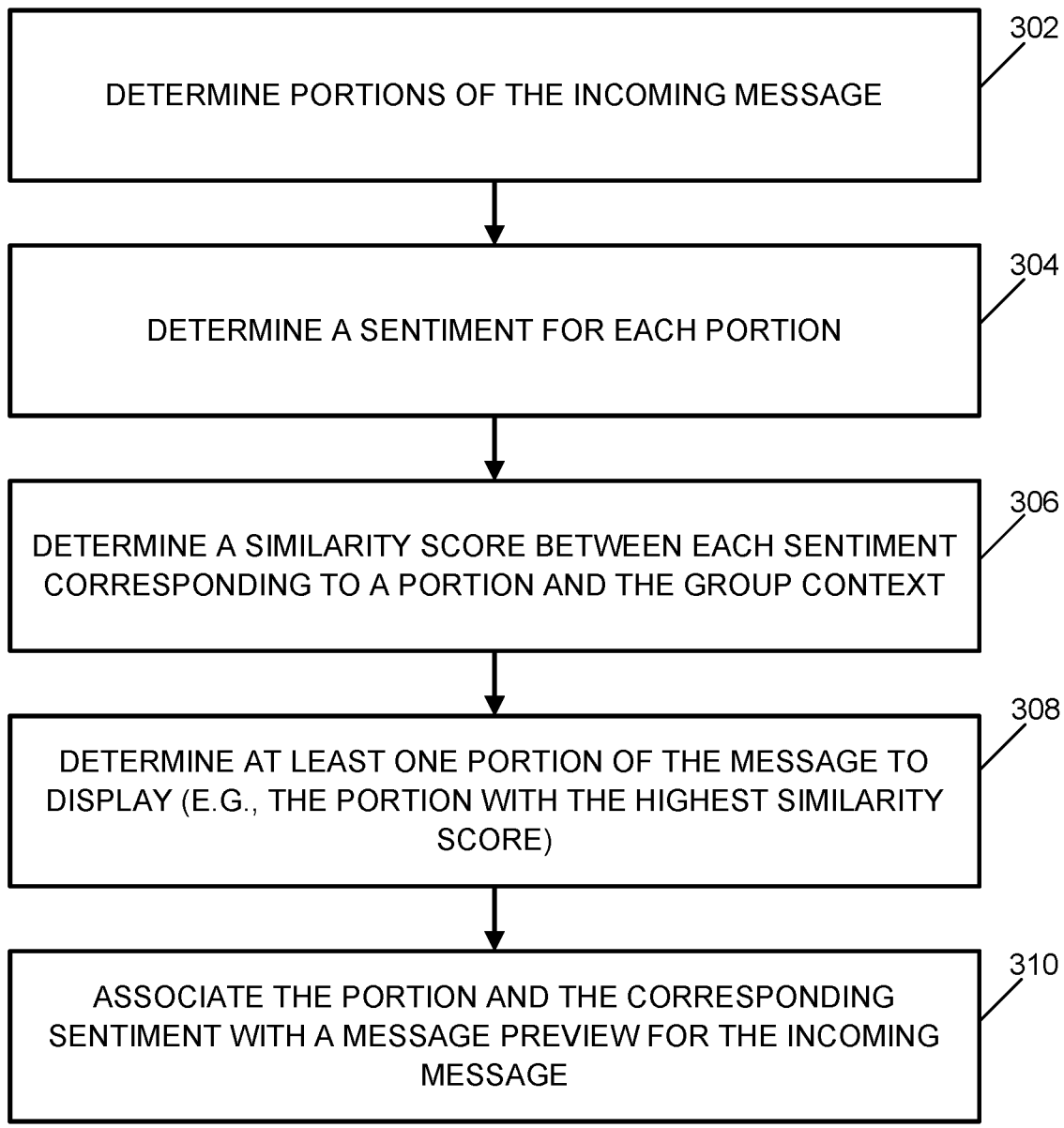
FIG. 3A is an example flow diagram of a method for generating a preview of an incoming message in accordance with some embodiments of the disclosed subject matter.

Turning to FIG. 3A, an example flow diagram of a process 300 for generating a preview of an incoming message, in accordance with some embodiments of the disclosed subject matter, is shown. In some embodiments, process 300 can be executed on any suitable device, such as server 402 and/or user devices 406 discussed below in connection with FIG. 4, and can be used with process 200.

In some embodiments, process 300 can begin at block 302, where process 300 can divide an incoming message into portions based on determined phrases, determined clauses, types of media (e.g., text, image, audio, video), etc., in the incoming message. For example, process 300 can use natural language processing, image processing, audio processing, and/or video processing to divide the incoming message. In some embodiments, at block 304, process 300 can determine at least one sentiment in each portion of the incoming message. In some embodiments, at block 306, process 300 can determine a similarity score between each sentiment in each portion of the incoming message and the context of the group.

In some embodiments, at block 308, process 300 can determine at least one portion to display based on the determined similarity scores, and remaining portions can be hidden. For example, in some embodiments, process 300 can determine a certain number N of portions to display based on the determined similarity scores, e.g., the first N portions having sentiments with the highest similarity scores, where N can be any suitable number such as 1, 2, 3, etc. In some embodiments, process 300 can determine the portions having sentiments with similarity scores within a predetermined range of values, and for example, sort these portions according to the similarity scores.

In some embodiments, at block 310, process 300 can associate the at least one portion to display and its sentiments with a preview of the incoming message. For example, the process 300 can include the at least one portion to display and its sentiments in with the preview of the incoming message.

Figure 3B:
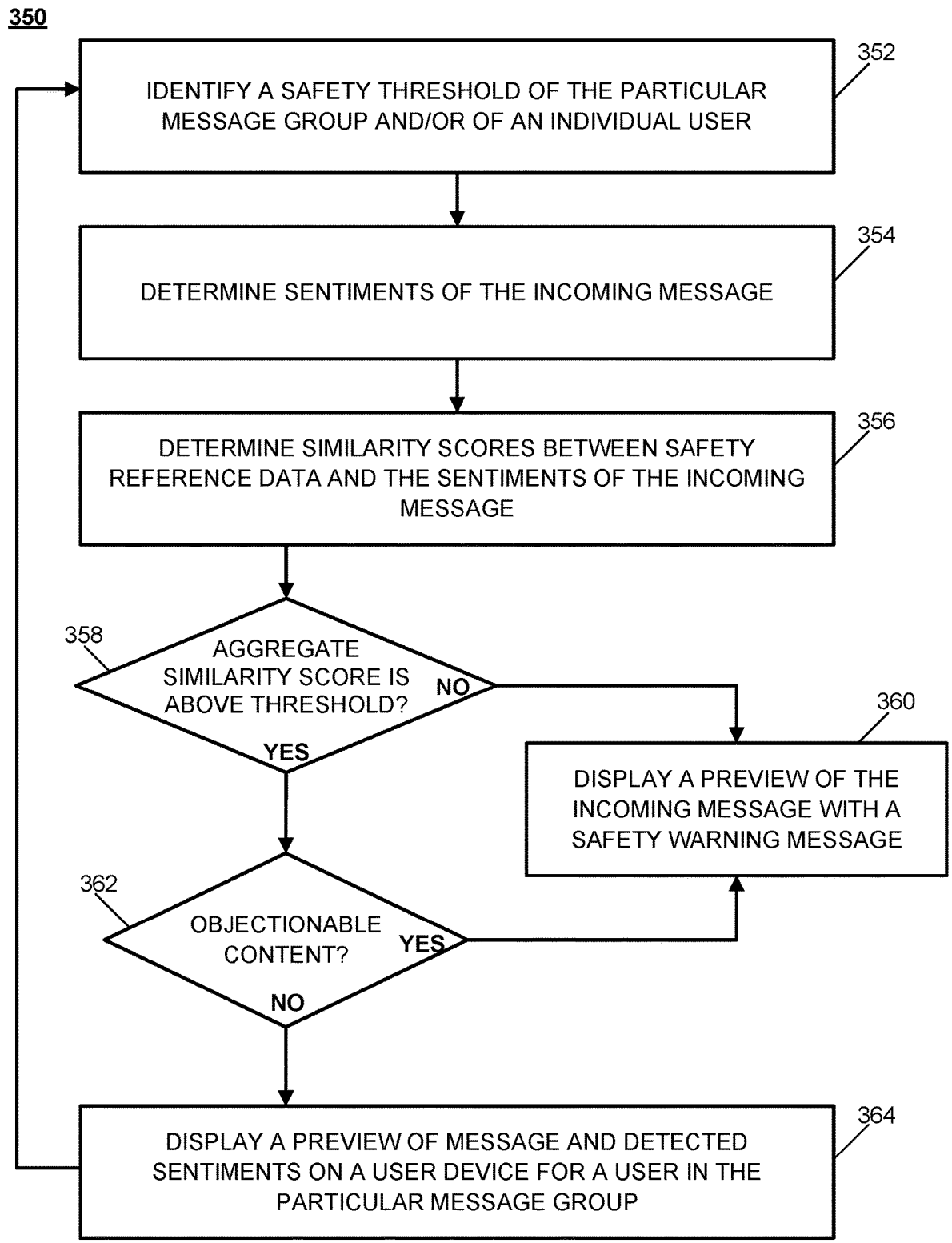
FIG. 3B is an example flow diagram of a method for generating a safety warning message included with a preview of an incoming message in accordance with some embodiments of the disclosed subject matter.

Turning to FIG. 3B, an example flow diagram of a process 350 for generating a safety score and a safety message that is included with a preview of an incoming message, in accordance with some embodiments of the disclosed subject matter, is shown. In some embodiments, process 350 can be executed as a sub-process of any other suitable automated review, such as process 200 as described above in connection with FIG. 2. In some embodiments, process 350 can access the incoming message received at block 202 of process 200, in addition to any other suitable information such as the particular message group, safety settings of members of the particular message group, sentiments of the incoming message (e.g., determined at block 204 of process 200), and/or any other suitable metadata of the incoming message.

In some embodiments, process 350 can continue to block 352, where process 350 can identify a safety threshold. In some embodiments, the messaging service can set a default safety threshold. In some embodiments, each individual group member can set their own safety threshold. In some embodiments the safety threshold can be set by a group administrator for all members of the particular message group. In some embodiments, the safety threshold can be selected from a range of qualitative values. For example, in some embodiments, the safety threshold can be set to a "low", "medium", or "high" safety threshold, which can correspond to a quantitative value and/or range of values. In some embodiments, the safety threshold can be configured in a user interface to include and/or exclude specific safety categories (e.g., adult content, spam, malware, etc.).

In some embodiments, process 350 can continue to block 354 where process 350 can determine sentiments of the incoming message. For example, process 350 can determine sentiments of the incoming message using the same machine learning classifier described above at block 204 of process 200 in connection with FIG. 2. In some embodiments, process 350 can access message sentiments that were previously determined by any other suitable process. In some embodiments, process 350 can determine to use the entirety of the incoming message for the remainder of process 350. For example, when the incoming message is entirely text-based, then process 350 can determine that the incoming message can be used for the remaining blocks of process 350. In another example, when the incoming message contains both text-based and non-textual elements (such as a GIF, an image, an emoji, etc.), process 350 can determine a sentiment for only the non-textual elements and can combine this sentiment with the text from the incoming message for the remaining blocks of process 350.

In some embodiments, process 350 can continue to block 356 where process 350 can determine a series of safety scores between a safety reference dataset and the sentiments of the incoming message determined at block 354 using, for example, a machine learning classifier. For example, in some embodiments, process 350 can use a cosine similarity score to determine the likelihood or probability that a sentiment from the incoming message is similar to one or more safety reference messages. In some embodiments, the safety reference dataset can include safety reference messages along with any other suitable data that has a safety reference rating. For example, in some embodiments, the safety reference dataset can include safety reference messages (e.g., text strings, images, emoji, etc.) that are paired with a safety reference rating (e.g., "safe," "unsafe," etc.). In this example, the safety reference rating can provide a weight to the safety reference messages that can be used to create a weighted safety score.

In some embodiments, process 350 can continue to block 358 where process 350 can determine any suitable aggregate safety score and/or statistic based on the safety scores determined at block 356, using for example, a machine learning classifier. In some embodiments, the aggregate safety score can be any suitable combination and/or output of a calculation using the safety scores. For example, the aggregate safety score can be a sum, a weighted sum (e.g., using the safety reference ratings as the weights), a max value, a min value, and/or any other representative value from the safety scores.

In some embodiments, at block 358, process 350 can compare the aggregate safety score to the safety threshold identified at block 352. In some embodiments, process 350 can determine that the aggregate safety score falls within a range of values defined by the safety threshold. For example, if the safety threshold is set as "high" by a user of the messaging service, this setting can correspond to a range of aggregate safety scores between 0.75 and 1, or 75% through 100%. In this example, because the safety scores are determined between the safety reference dataset and the sentiments from the incoming message, a high similarity of the message sentiments to the safety reference dataset can indicate that the message has a high amount of safety. In another example, if the safety threshold is set as "low" by a user of the messaging service, this setting can correspond to a range of aggregate safety scores between 0 and 0.3, or 0% to 30%. In this example, a low similarity of the message sentiments to the safety reference dataset can indicate that the message has a low amount of safety.

In some embodiments, at block 358, process 350 can determine that the aggregate safety score falls below, or outside, of the range of values corresponding to the safety threshold. In some embodiments, at block 358, process 350 can continue to block 360.

In some embodiments, at block 358, process 350 can determine that the aggregate safety score falls within the range of values corresponding to the safety threshold. In some embodiments, at block 358, process 350 can then continue to block 362.

In some embodiments, at block 360, process 350 can combine a safety warning message with a message preview (e.g., preview 124, and/or a preview determined using process 300 as described above in connection with FIG. 3A) and can display the combined preview to a user. In some embodiments, process 350 can include the aggregate safety score at block 360. For example, in some embodiments, when process 350 is executed on a user device for a user composing a message to the particular message group, a message preview can be presented that includes the aggregate safety score along with a message that reads, "Because the safety score for the message that you want to send is lower than the safety threshold for the message group, this message is unlikely to be posted to the message group." In another example, in some embodiments, when process 350 is executed on a user device for a user receiving a message to the particular message group, a message preview can be presented that includes the aggregate safety score along with a message that reads, "You will not receive the full message content because the safety score of this message is lower than your user-configured safety threshold."

In some embodiments, at block 362, process 350 can determine if the incoming message and/or message sentiments contain objectionable content. For example, in some embodiments, process 350 can use any suitable mechanism to identify spam, malicious code, adult content, violence, and/or any other objectionable content within the incoming message. As a particular example, in some embodiments, process 350 can analyze the safety scores to determine that a photo included in an incoming message has a high similarity to a subset of the safety reference data that contains references to violence. In this particular example, in some embodiments, process 350 can determine that the photo included in the incoming message likely includes violent imagery.

In some embodiments, when process 350 determines at block 362 that objectionable content is included in the incoming message, process 350 can continue to block 360.

In some embodiments, when process 350 determines at block 362 that no objectionable content is included in the incoming message, process 350 can continue to block 364.

In some embodiments, at block 364, process 350 can display a preview of the incoming message. For example, in some embodiments, process 350 can display a preview such as preview 124 as discussed above in connection with FIG. 1. In another example, in some embodiments, process 350 can generate a preview for display at block 364 using any suitable mechanism, such as process 300 as described above in connection with FIG. 3A. In some embodiments, process 350 can display the preview of the incoming message on any suitable user device, such as a user device that is associated with the particular message group. In some embodiments, process 350 can display the preview as a notification (e.g., push notification) and/or any suitable new message icon in a user interface associated with the messaging service. In some embodiments, process 350 can display the preview of the incoming message on any suitable user device along with indications that the aggregated safety score is below the safety threshold (e.g., deemed to be "safe" content) and that the message is unlikely to contain objectionable content.

Figure 4:
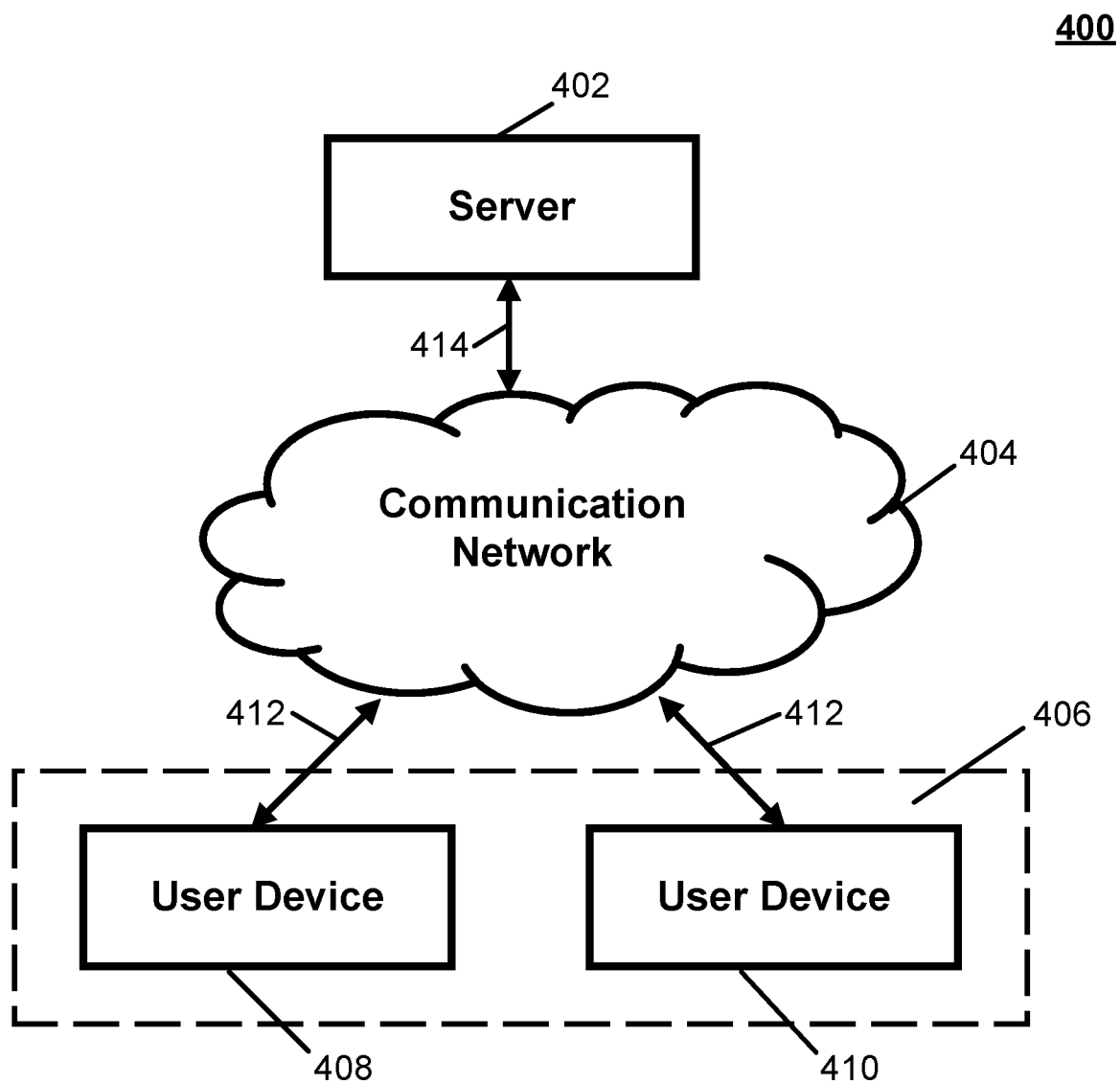
FIG. 4 is an example block diagram of a system that can be used to implement mechanisms described herein in accordance with some implementations of the disclosed subject matter.

Turning to FIG. 4, an example 400 of hardware for automating review of incoming messages in a group messaging service in accordance with some implementations is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some implementations, server 402 can perform any suitable function(s).

Communication network 404 can be any suitable combination of one or more wired and/or wireless networks in some implementations. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for use with block diagram 100, process 200, and/or process 300. In some implementations, user device 406 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some implementations. For example, in some implementations, multiple devices can be used to implement the functions performed by server 402.

Although two user devices 408 and 410 are shown in FIG. 4 to avoid overcomplicating the figure, any suitable number of user devices, (including only one user device) and/or any suitable types of user devices, can be used in some implementations.

Figure 5:
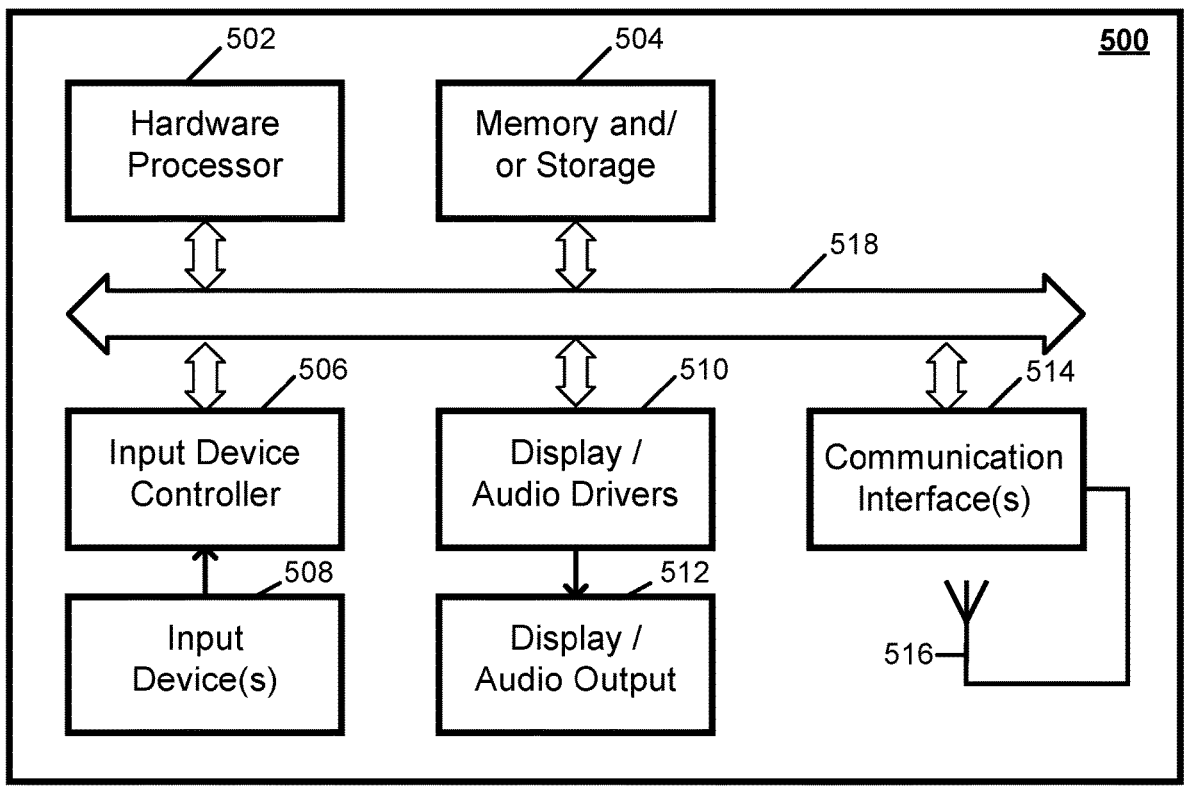
FIG. 5 is an example block diagram of hardware that can be used in a server and/or a user device in accordance with some implementations of the disclosed subject matter.

Server 402 and user devices 406 can be implemented using any suitable hardware in some implementations. For example, in some implementations, devices 402 and 406 can be implemented using any suitable general-purpose computer or special-purpose computer and can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 504, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some implementations. In some implementations, hardware processor 502 can be controlled by a computer program stored in memory and/or storage 504. For example, in some implementations, the computer program can cause hardware processor 502 to perform functions described herein.

Memory and/or storage 504 can be any suitable memory and/or storage for storing programs, data, documents, and/or any other suitable information in some implementations. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some implementations. For example, input device controller 506 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some implementations. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some implementations. In some implementations, antenna 516 can be omitted.

Bus 518 can be any suitable mechanism for communicating between two or more components 502, 504, 506, 510, and 514 in some implementations.

Any other suitable components can be included in hardware 500 in accordance with some implementations.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of processes 200, 300, and 350 can be executed or performed in any order or sequence not limited to the order and sequence shown in and described in connection with FIGS. 2, 3A, and 3B. Also, some of the above blocks of processes 200, 300, and 350 can be executed or performed substantially simultaneously where appropriate or in parallel to reduce latency and processing times. Additionally or alternatively, some of the above described blocks of processes 200, 300, and 350 can be omitted.

Accordingly, methods, systems, and media for providing automated review of incoming messages in a group messaging service are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for presenting messages in a group messaging service, the method comprising:
receiving, at a user device from a server, an incoming message to a particular message group in a group messaging service, wherein the user device is associated with the particular message group;
determining, using a machine learning classifier at the user device,
(i) a context of the particular message group based on a plurality of content items previously submitted by a plurality of users to the particular message group;
(ii) a plurality of sentiments in the incoming message;
(iii) a plurality of similarity scores, wherein each similarity score is a probability that a sentiment from the plurality of sentiments is similar to the context of the particular message group; and
(iv) an aggregate similarity score based on the plurality of similarity scores is within a first range of predetermined values; and
in response to determining the aggregate similarity score is within the first range of predetermined values, displaying a preview of the incoming message on the user device, wherein the preview includes at least one sentiment from the plurality of sentiments.

2. The method of claim 1, wherein determining the plurality of similarity scores further comprises determining a cosine similarity score between a sentiment from the plurality of sentiments and the context of the particular message group.

3. The method of claim 1, wherein determining the aggregate similarity score based on the plurality of similarity scores further comprises determining a plurality of statistics for the plurality of similarity scores and additionally determining that at least one statistic in the plurality of statistics is equivalent to a target statistical value from a plurality of target statistical values.

4. The method of claim 3, further comprising:
determining, using the plurality of statistics, that a particular sentiment from the plurality of sentiments is an anomalous sentiment from the plurality of sentiments; and
in response to determining that the particular sentiment is the anomalous sentiment, sending the incoming message to the server with a request for review of the incoming message from an administrative user of the particular message group.

5. The method of claim 4, further comprising:
receiving an indication from the server that the incoming message is approved by the administrative user; and
in response to receiving the indication that the incoming message is approved, displaying the preview of the incoming message on the user device.

6. The method of claim 4, further comprising:
receiving an indication from the server that the incoming message is disapproved by the administrative user; and
in response to receiving the indication that the incoming message is rejected, discarding the incoming message without displaying the preview of the incoming message on the user device.

7. The method of claim 1, further comprising:
determining that the aggregate similarity score based on the plurality of similarity scores is outside of the first range of predetermined values;
in response to determining that the aggregate similarity score is outside of the first range of predetermined values, sending the incoming message to the server with a request to review a membership status for the particular message group of a particular user that created the incoming message; and
discarding the incoming message without displaying the preview of the incoming message on the user device.

8. The method of claim 1, further comprising:
determining that a second user device has reported the incoming message to the server as being incompatible with the context of the particular message group; and
in response to determining that the second user device has reported the incoming message, discarding the incoming message without displaying the preview of the incoming message on the user device.

9. The method of claim 8, further comprising associating at least one of an indication of the second user device reporting the incoming message, the context of the particular message group, the plurality of sentiments from the incoming message, and the plurality of similarity scores with a training dataset for the machine learning model.

10. The method of claim 1, wherein the machine learning classifier is trained at the server with a training dataset comprising a second plurality of content items from a second message group in the group messaging service, wherein the machine learning classifier, during training, determines the probability that a second plurality of sentiments from each content item in the second plurality of content items is similar to the context of the second message group.

11. The method of claim 1, further comprising:
determining, using the machine learning classifier at the user device, a plurality of safety scores, wherein each safety score is a probability that a sentiment from the plurality of sentiments is similar to a reference message in a safety reference dataset;
determining an aggregate safety score;
identifying a second range of predetermined values corresponding to a safety threshold for the user device;
determining that the aggregate safety score is outside of the second range of predetermined values;
in response to determining that the aggregate safety score is outside the second range of predetermined values, displaying a preview of the incoming message with a safety warning message included in the preview of the incoming message.

12. A system for presenting messages in a group messaging service, the system comprising:
a hardware processor that is configured to:
receive, at a user device from a server, an incoming message to a particular message group in a group messaging service, wherein the user device is associated with the particular message group;
determine, using a machine learning classifier at the user device, (i) a context of the particular message group based on a plurality of content items previously submitted by a plurality of users to the particular message group;
(ii) a plurality of sentiments in the incoming message;
(iii) a plurality of similarity scores, wherein each similarity score is a probability that a sentiment from the plurality of sentiments is similar to the context of the particular message group; and
(iv) an aggregate similarity score based on the plurality of similarity scores is within a first range of predetermined values; and
in response to determining the aggregate similarity score is within the first range of predetermined values, display a preview of the incoming message on the user device, wherein the preview includes at least one sentiment from the plurality of sentiments.

13. The system of claim 12, wherein determining the plurality of similarity scores further comprises determining a cosine similarity score between a sentiment from the plurality of sentiments and the context of the particular message group.

14. The system of claim 12, wherein determining the aggregate similarity score based on the plurality of similarity scores further comprises determining a plurality of statistics for the plurality of similarity scores and additionally determining that at least one statistic in the plurality of statistics is equivalent to a target statistical value from a plurality of target statistical values.

15. The system of claim 14, wherein the hardware processor is further configured to:
determine, using the plurality of statistics, that a particular sentiment from the plurality of sentiments is an anomalous sentiment from the plurality of sentiments; and
in response to determining that the particular sentiment is the anomalous sentiment, send the incoming message to the server with a request for review of the incoming message from an administrative user of the particular message group.

16. The system of claim 15, wherein the hardware processor is further configured to:
receive an indication from the server that the incoming message is approved by the administrative user; and
in response to receiving the indication that the incoming message is approved, display the preview of the incoming message on the user device.

17. The system of claim 15, wherein the hardware processor is further configured to:
receive an indication from the server that the incoming message is disapproved by the administrative user; and
in response to receiving the indication that the incoming message is rejected, discard the incoming message without displaying the preview of the incoming message on the user device.

18. The system of claim 12, wherein the hardware processor is further configured to:
determine that the aggregate similarity score based on the plurality of similarity scores is outside of the first range of predetermined values;
in response to determining that the aggregate similarity score is outside of the first range of predetermined values, send the incoming message to the server with a request to review a membership status for the particular message group of a particular user that created the incoming message; and
discard the incoming message without displaying the preview of the incoming message on the user device.

19. The system of claim 12, wherein the hardware processor is further configured to:
determine that a second user device has reported the incoming message to the server as being incompatible with the context of the particular message group; and
in response to determining that the second user device has reported the incoming message, discard the incoming message without displaying the preview of the incoming message on the user device.

20. The system of claim 19, wherein the hardware processor is further configured to associate at least one of an indication of the second user device reporting the incoming message, the context of the particular message group, the plurality of sentiments from the incoming message, and the plurality of similarity scores with a training dataset for the machine learning model.

21. The system of claim 12, wherein the machine learning classifier is trained at the server with a training dataset comprising a second plurality of content items from a second message group in the group messaging service, wherein the machine learning classifier, during training, determines the probability that a second plurality of sentiments from each content item in the second plurality of content items is similar to the context of the second message group.

22. The system of claim 12, wherein the hardware processor is further configured to:
determine, using the machine learning classifier at the user device, a plurality of safety scores, wherein each safety score is a probability that a sentiment from the plurality of sentiments is similar to a reference message in a safety reference dataset;
determine an aggregate safety score;
identify a second range of predetermined values corresponding to a safety threshold for the user device;
determine that the aggregate safety score is outside of the second range of predetermined values;
in response to determining that the aggregate safety score is outside the second range of predetermined values, display a preview of the incoming message with a safety warning message included in the preview of the incoming message.

23. A non-transitory computer-readable medium containing computer executable instructions that, when executed by a processor, cause the processor to perform a method for presenting messages in a group messaging service, the method comprising:
receiving, at a user device from a server, an incoming message to a particular message group in a group messaging service, wherein the user device is associated with the particular message group;
determining, using a machine learning classifier at the user device,
(i) a context of the particular message group based on a plurality of content items previously submitted by a plurality of users to the particular message group;
(ii) a plurality of sentiments in the incoming message;
(iii) a plurality of similarity scores, wherein each similarity score is a probability that a sentiment from the plurality of sentiments is similar to the context of the particular message group; and
(iv) an aggregate similarity score based on the plurality of similarity scores is within a first range of predetermined values; and in response to determining the aggregate similarity score is within the first range of predetermined values, displaying a preview of the incoming message on the user device, wherein the preview includes at least one sentiment from the plurality of sentiments.

* * * * *